United States Patent [19]

Knez

[11] Patent Number: 5,441,145

[45] Date of Patent: Aug. 15, 1995

[54] ELEVATOR DEVICE

[75] Inventor: Jordan Knez, Andregatan, Sweden

[73] Assignee: J. Knez AB, Halmstead, Sweden

[21] Appl. No.: 187,714

[22] Filed: Jan. 28, 1994

[30] Foreign Application Priority Data

Jan. 29, 1993 [SE] Sweden ................................ 9300299

[51] Int. Cl.6 ................................................ B65G 17/36
[52] U.S. Cl. ...................................... 198/705; 198/706;
198/477.1; 198/801
[58] Field of Search ................ 198/703, 705, 706, 711,
198/365, 366, 372, 801, 474.1, 476.1, 477.1

[56] References Cited

U.S. PATENT DOCUMENTS

| 839,467 | 12/1906 | German | 198/705 |
| 2,545,377 | 3/1951 | Parisi | 198/705 |
| 3,750,860 | 8/1973 | Jaffre | 198/706 X |
| 4,770,286 | 9/1988 | Opperthauser | 198/476.1 |
| 5,169,273 | 12/1992 | Kawamura | 198/477.1 X |

FOREIGN PATENT DOCUMENTS

| 1201759 | 9/1965 | Germany | 198/705 |
| 0905159 | 2/1982 | U.S.S.R. | 198/705 |

Primary Examiner—James R. Bidwell
Attorney, Agent, or Firm—Antonelli, Terry, Stout & Kraus

[57] ABSTRACT

A substantially vertical elevator (5) for the transport of round and/or spherical objects, for example golf balls, between different levels, the elevator including a conveyor belt (11) which extends between an upper roller at an upper level and a lower roller at a lower level and which passes a number of emptying points between the rollers. A number of spaced carrier planes (12) extending transversely of the conveyor belt, on which planes the objects are capable of resting during the movement of the conveyor belt (11) from a replenishment point (6) to the emptying point or emptying points. An ejector (13) is disposed, between the carrier planes (12) and is actuable at the emptying points for removal of the objects on the adjacent carrier plane (12) to a receptacle container provided at the emptying point in question.

7 Claims, 2 Drawing Sheets

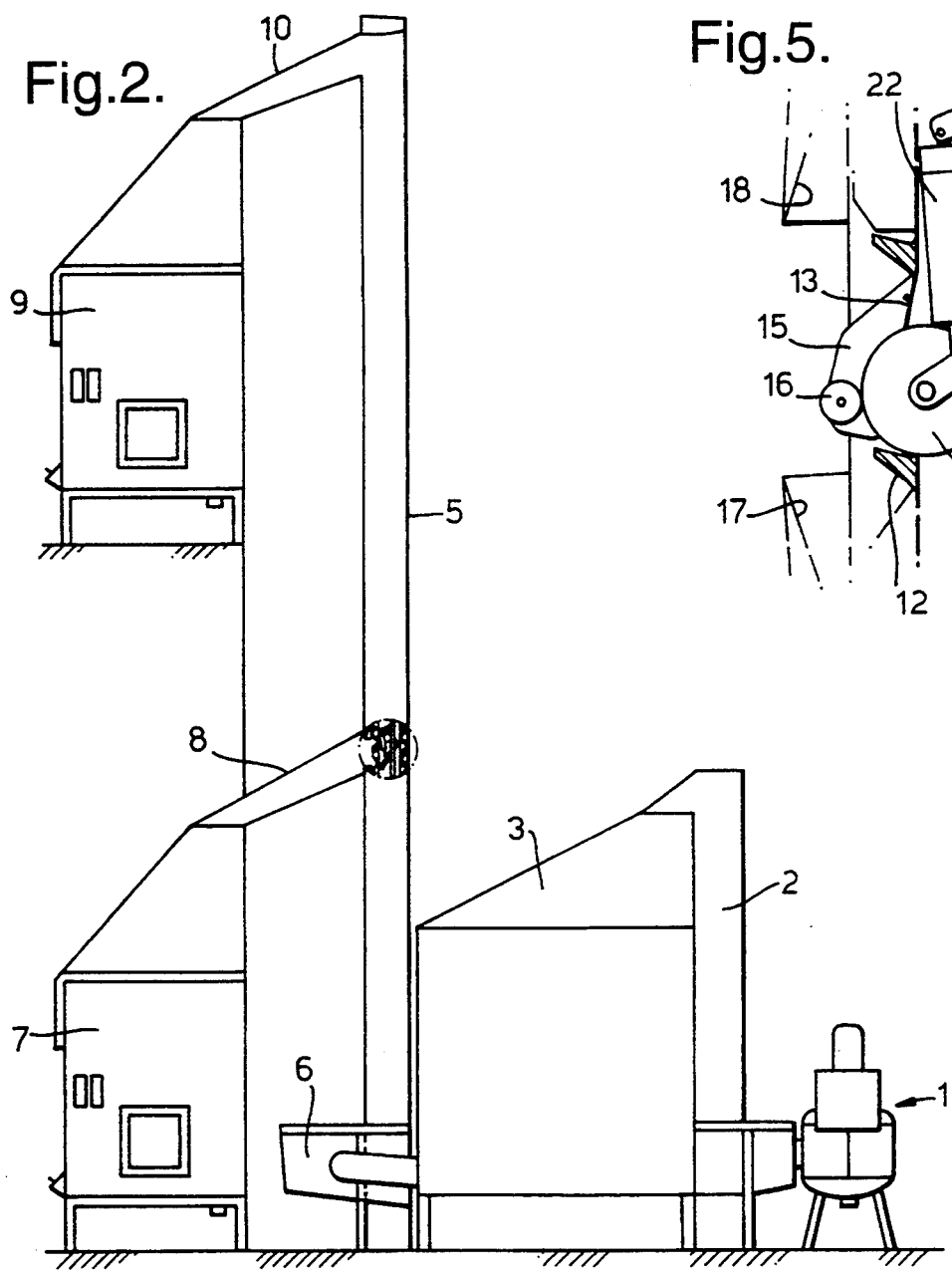

ELEVATOR DEVICE

BACKGROUND OF THE INVENTION

The present invention relates to a device in a substantially vertical elevator for the transport of round and/or spherical objects, for example golf balls, between different levels, the elevator including a conveyor belt which extends between an upper roller at an upper level and a lower roller at a lower level and which passes a number of emptying points between the rollers, and which has a number of spaced carrier planes extending transversely of the conveyor belt, on which planes the objects are capable of resting during the movement of the conveyor belt from a replenishment point to the emptying point or emptying points.

Prior art vertical elevators do not possess the possibility of emptying or ejecting objects optionally along the path of the vertical conveyor. This is a considerable inconvenience, since there is then required one vertical elevator for each emptying or ejecting point. This in turn leads to considerable cost increases, not only from the point of view of capital investment, but also to a considerable degree in respect of costs for repair and maintenance.

SUMMARY OF THE INVENTION

The task forming the basis of the present invention is to satisfy the above-outlined needs and thereby obviate or at least reduce the drawbacks inherent in prior art vertical elevators.

This task is solved according to the present invention in that the device disclosed by way of introduction is characterized in that there is disposed, between the carrier planes, an ejector which is actuable at the emptying points for removal of the objects on the adjacent carrier plane to a receptacle container provided at the emptying point in question. The ejector is in the form of a disk whose one edge is free and extends for engagement with the objects for ejecting same from the carrier plane or activation of the ejector proper and whose opposite edge is anchored so as to permit outward pivoting of said one edge out over the carrier plane. The ends of the disk are bent substantially at right angles out from the conveyor belt and form ends of the carrier planes. The bent disk ends are each provided with a wheel for cooperation with guide plates above and below the emptying points. An activation mechanism is arranged at each emptying point and includes an activator device which, on desired emptying, pivots the ejector disk out over the carrier plane. The activator device is a pivotal arm whose free end carries a roller for abutment against the inside of the conveyor belt and which is pivotal from a rest position in which the carrier plane passes the arm without being emptied, to an emptying position in which the conveyor belt is pressed outwardly from its normal path and the ejector disk is pivoted over the carrier plane for emptying the same on passage of the arm end. The arm is interconnected with a piston and cylinder assembly for pivoting thereof between the rest position and the emptying position.

As a result of the device according to the present inventions, it is possible to provide a vertical elevator with theoretically any optional number of emptying points and optional selection of those emptying points which are to be passed without emptying taking place, and thereby free selection of the emptying point. This permits one vertical elevator to serve an optional number of vertical levels, for example different storeys in a building, for instance a sports hall. As a result of the device according to the present invention, it is thus possible to make considerable savings not only from the point of view of capital investment, but also from the point of view of repair and maintenance.

BRIEF DESCRIPTION OF THE DRAWINGS

The present invention will now be described in greater detail hereinbelow, with particular reference to the accompanying Drawings.

FIG. 1 is a top plan view of an installation with a device according to one embodiment of the present invention.

FIG. 2 is a side elevation of the installation of FIG. 1.

FIG. 5 shows a similar section to that of FIG. 4 of another embodiment of the device according to the present invention.

DETAILED DESCRIPTION OF PREFERRED EMBODIMENTS

Figure 3:
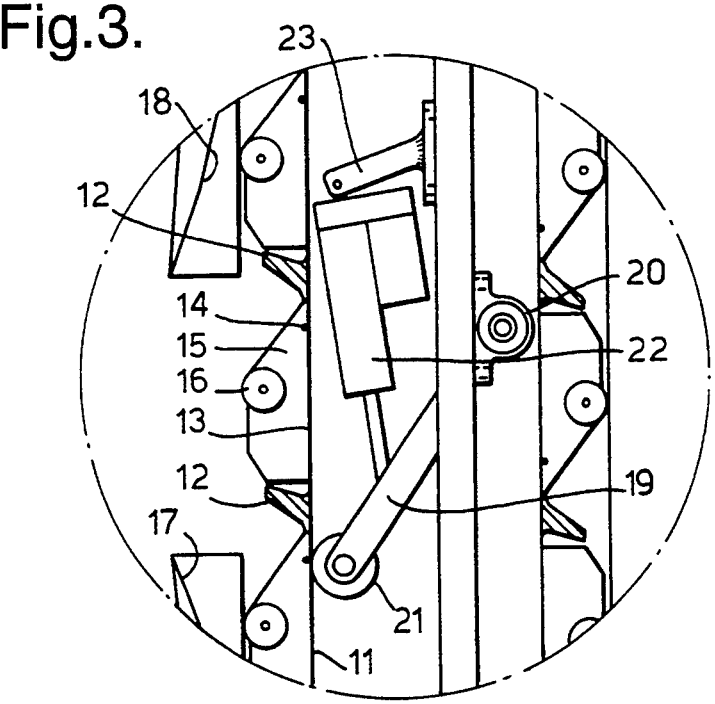
FIG. 3 shows, in cross section and on a larger scale, the encircled part of FIG. 2, the components being illustrated in the rest position.

FIGS. 1 and 2 show an installation for handling golf balls, in which a device according to the present invention is put into effect. The installation includes a ball washing machine 1, a vertical conveyor 2 which conveys golf balls from the washing machine 1 to a receptacle container 3. From the receptacle and storage container 3, the golf balls are fed via a transfer drum 4 to the lower region of a further vertical conveyor 5. In said lower region of the vertical conveyor 5, there is included a replenishment point 6. On the same level as the washing machine 1 and the receptacle and storage container 3, there is disposed an automatic golf ball dispenser 7 of per se known design and construction which, at the top, is connected to an emptying point via a drum 8. At another level above the automatic golf ball dispenser 7, there is disposed an additional automatic golf ball dispenser 9 which is also connected to an emptying point via a drum 10. If desired, an optional number of automatic golf ball dispensers may be provided at different levels above one another and be connected via drums to one and the same vertical conveyor.

Figure 4:
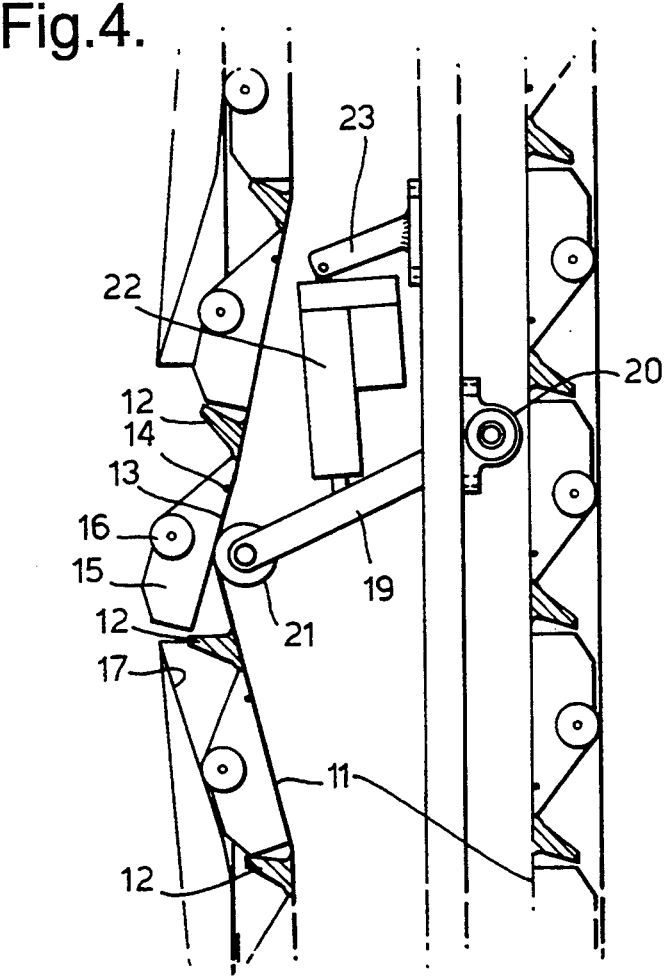
FIG. 4 shows a similar section to that of FIG. 3 but with the components in the ejection or emptying position.

The vertical conveyor 5 includes a conveyor belt 11 which extends substantially vertically between a lower roller which is placed at the lower end of the conveyor drum, and an upper roller which is placed at the top in the conveyor drum. Thus, the conveyor belt 11 is enclosed in a suitable drum. FIGS. 3 and 4 show one emptying point in closer detail. The upper and lower rollers may be disposed in a per se known manner, the lower roller being suitably driven, while the upper roller is an idler roller. Furthermore, suitable tensioning devices may be included in the vertical conveyor.

It will be clearly apparent from FIGS. 3 and 4 that the conveyor belt 11 has a number of spaced carrier planes 12 which extend transversely of the conveyor belt 11 and which are substantially at right angles to the conveyor belt 11, at least on the upwardly going part of the conveyor belt. The upwardly directed surface of the carrier plane 12 on the upwardly going part of the conveyor belt 11 may, as illustrated, have a slightly smaller angle to the belt than 90°. The upwardly going part is shown to the left in FIGS. 3 and 4, while the part of the conveyor belt shown to the right is the downward part.

Adjacent each emptying point drum 8, 10, there is disposed an ejector disk or plate 13 which, at the upper, upwardly going edge, is secured to the conveyor belt 11 with the aid of rivets or screws 14, while the ejector plate 13 is otherwise free from the conveyor belt so that the opposite edge of the ejector plate 13 relative to the rivets or screws 14 is pivotal out from the conveyor belt 11. The ends of the ejector disk or ejector plate 13 are bent at an angle of substantially 90° in relation to the conveyor belt 11 and form end walls 15 for the carrier surface formed by the carrier planes 12. On this surface, there may be a number of objects beside one another. A wheel or roller 16 is disposed on the end walls 15.

The carrier planes 12 may be mounted on the conveyor belt 11 or may be disposed in a unit with the conveyor belt 11, which suitably may consist of an appropriate plastics or rubber material. Below the emptying point, there is provided a guide plate 17 against which the wheels or rollers 16 may rest during an emptying phase. Above the emptying point, there is provided yet a further guide plate 18 against which the wheels or rollers 16 may rest for returning the conveyor belt 11 and the ejector disks 13 to the normal position after an emptying phase.

FIG. 3 shows the emptying point in the rest position, where possible objects on the carrier plane 12 will be conveyed past the plane. FIG. 4 shows the emptying point after activation of an ejection mechanism. This ejection mechanism consists of an arm 19 whose one end is pivotally journalled in the conveyor drum with the aid of a journal housing 20 and whose opposite end carries a roller or a wheel 21. For pivoting the arm 19, a piston and cylinder assembly 22 is provided, the cylinder end thereof being secured in the conveyor drum via an anchorage device 23 and the piston end being pivotally secured in the arm 19. As is apparent from FIGS. 3 and 4, the arm 19 will be pivoted clockwise from the position shown in FIG. 3 to the position shown in FIG. 4 on retraction of the piston in the piston and cylinder assembly 22. The wheel 21 on the end of the arm 19 will press out the upwardly going part of the conveyor belt 11 from the rest position illustrated in FIG. 3 to the emptying position illustrated in FIG. 4. When the ejector plate 13 passes the wheel or roller 21, the ejector plate free edge which is located most proximal the carrier plane 12 that is beneath that ejector plate 3, will begin to pivot outwardly from the conveyor belt 11 as soon as the screws or rivets 14 of that ejector plate have passed the wheel or roller 21 so that the free edge pivots out over the carrier plane 12 and removes any possible golf balls located on the carrier plane 12. Thus, the ejector plate 13 will remove the balls from the carrier plane 12 and throw them down into the drum 8 or 10, as long as the arm 19 is located in the emptying position illustrated in FIG. 4.

The piston and cylinder assembly 22 may naturally be regulated in various desired manners. It is also conceivable to regulate the piston and cylinder assembly 22 by means of a level sensor provided in the automatic golf ball dispensers 7, 9. All level sensors may be coupled to a common automatic unit for controlling, for example, both the vertical conveyor 5 proper and the different piston and cylinder assemblies 22. Such an automatic unit is ideally arranged so that replenishment of the conveyor 5 ceases before the conveyor is stopped, so that the weight of golf balls on the conveyor does not overload it during the rest periods. Naturally, the uppermost emptying point need not have any pivotal ejection mechanism of the above-described type, but a fixed ejection mechanism for the positive emptying of the uppermost emptying point.

In the embodiment according to FIG. 5, the roller or wheel 21 is larger than in the embodiment according to FIG. 4 and acts directly on the wheel or roller 16 for the emptying pivoting of the ejector disk 13. In this embodiment, at least that wheel or that roller 16 which cooperates with the wheel or roller 21 is placed on the outside of the end wall of the ejector disks 13, and more proximal their rear edge, while, in the embodiment according to FIGS. 3 and 4, they may be placed either on the inside or the outside of one or both of the end walls.

Naturally, many alterations and modifications are possible without departing from the spirit and scope of the inventive concept as defined in the appended claims.

I claim:

1. A substantially vertical elevator for the transporting of objects from a replenishment point to receptacle containers at different levels of elevation, the elevator comprising:

an upper roller;

a lower roller;

a conveyor belt extending between the upper roller and the lower roller and passing a plurality of emptying points between the rollers;

a plurality of spaced carrier planes extending transversely from the conveyor belt for carrying objects during the movement of the carrier planes from the replenishment point to the emptying points;

a plurality of ejectors, one ejector disposed between each adjacent pair of the carrier planes, each ejector being separately actuable at selected ones of the emptying points during movement of the carrier planes, for removal of objects on the adjacent carrier plane to a receptacle container at the emptying point.

2. A substantially vertical elevator for the transporting of objects from a replenishment point to receptacle containers at different levels of elevation, the elevator comprising:

an upper roller;

a lower roller;

a conveyor belt extending between the upper roller and the lower roller and passing a plurality of emptying points between the rollers;

a plurality of spaced carrier planes extending transversely from the conveyor belt for carrying objects during the movement of the carrier planes from the replenishment point to the emptying points;

a plurality of ejectors, one ejector disposed between each adjacent pair of the carrier planes, each ejector being separately actuable at separate ones of the emptying points during movement of the carrier planes, for removal of objects on the adjacent carrier plane to a receptacle container at the emptying point, each ejector having a free edge movable for engagement with the objects on the adjacent carrier plane, to eject such objects from the carrier plane upon activation of the ejector, and having an opposite edge anchored to the conveyor belt and permitting outward pivoting of the free edge over the carrier plane.

3. The device as claimed in claim 1 or 2, wherein the ends of the ejectors are bent substantially at right angles out from the conveyor belt to form ends for the carrier planes.

4. The device as claimed in claim 3, further comprising guide plates above and below each emptying point, and a wheel on the bent ejector ends for cooperating with the guide plates in ejecting the objects from the carrier planes.

5. The device as claimed in claim 1 or 2, further comprising an activation mechanism at each emptying point, each activating mechanism including an activator member for pivoting the ejector out over the carrier plane.

6. The device as claimed in claim 5, wherein the activator member comprises a pivotal arm having a free end, and a roller carried by the arm free end for abutment against the inside of the conveyor belt, the arm being pivotal from a rest position in which the carrier planes pass the arm without being emptied, to an emptying position in which the arm presses the conveyor belt outward from its normal path and the ejector is pivoted over the carrier plane for emptying of the carrier planes on passage of the arm free end.

7. The device as claimed in claim 6, further comprising a piston and cylinder assembly for pivoting the arm between the rest position and the emptying position.

* * * * *